United States Patent [19]

Arai et al.

[11] Patent Number: 4,824,537

[45] Date of Patent: Apr. 25, 1989

[54] WORKING SUBSTANCES USED IN LASER ISOTOPE SEPARATION AND METHOD OF LASER ISOTOPE SEPARATION

[75] Inventors: Shigeyoshi Arai, Tokyo; Masatsugu Kamioka, Urawa; Yo-ichi Ishikawa, Wako; Shohei Isomura; Kyoko Sugita, both of Tokyo; Takao Oshima, Niigata; Tatsuhiko Honguu, Yokohama, all of Japan

[73] Assignees: Rikagaku Kenkyusho, Wako; Shin-Etsu Chemical Co., Ltd., Tokyo, both of Japan

[21] Appl. No.: 824,222

[22] Filed: Jan. 30, 1986

[30] Foreign Application Priority Data

Feb. 6, 1985 [JP] Japan .................................. 60-21577
Aug. 21, 1985 [JP] Japan ................................ 60-183680

[51] Int. Cl.$^4$ ............................................. B01D 59/34
[52] U.S. Cl. ............................. 204/157.22; 204/157.21
[58] Field of Search .................... 204/157.22; 423/341, 423/342; 556/465

[56] References Cited

U.S. PATENT DOCUMENTS

| | | | |
|---|---|---|---|
| 3,026,173 | 3/1962 | Pease | 423/342 |
| 3,951,768 | 4/1976 | Gürs | 204/157.22 |
| 4,049,515 | 6/1977 | Robinson et al. | 204/157.22 |
| 4,070,444 | 1/1978 | Ingle | 423/341 X |
| 4,550,105 | 10/1985 | Matsuo et al. | 514/210 |
| 4,637,938 | 1/1987 | Lee et al. | 427/53.1 |

OTHER PUBLICATIONS

"Isotope-Selective Infrared Multiple Photon Decomposition Of Hexafluorodisilane" by Masatsugu Kamioka et al.; J. Phys. Chem. 1986, 90, pp. 5727-5730.
"Silicon-29 and Silicon-30 Enrichment by Irmpd Infrared Multiple-Photon Decomposition of Disilicon Hexafluoride" By Masatsugu Kamioka et al. (Abstract Attached).
Chemical Abstracts, vol. 84, 1976, p. 467, J. L. Lyman et al.; "Enrichment of Boron, Carbon and Silicon Isotopes By Multiple-Photon Absorption of 10.6-$\mu$m Laser Radiation" & J. Appl. Phys., 1976.
"Enrichment of boron, carbon, and silicon isotopes by multiple-photon absorption of 10.6-$\mu$m laser radiation*"; John L. Lyman (1976) Journal of Applied Physics, vol. 47 No. 2; pp. 595-601.
Chem. Ab. 74(20):105322n; Hamada et al.; 1971.
Chem. Ab. 75(8):56285n; Dele-Dubois et al.; 1971.

Primary Examiner—John F. Terapane
Assistant Examiner—Virginia B. Caress
Attorney, Agent, or Firm—Oblon, Fisher, Spivak, McClelland & Maier

[57] ABSTRACT

Silicon isotopes are effectively separated by irradiating a polysilane compound or a fluoromosilane compound according to this invention with infrared laser rays. The polysilane compound is defined by the formula.

$$Si_a X_b H_c$$

where $2 \leq a \leq 3$, $0 \leq b \leq 2a+2$, $2a+2=b+c$ and X represents a kind or kinds of halogen, and the fluoromonosilane compound is defined by the formula.

$$SiFX_1 X_2 X_3$$

where $X_1$ and $X_2$ are selected from the group consisting of H, Cl, Br, I, F, an alkyl radical and a halogen derivative of the alkyl radical, and $X_3$ is selected from the group consisting of H, Cl, Br, I, an alkyl radical and a halogen derivative of the alkyl radical.

2 Claims, 5 Drawing Sheets

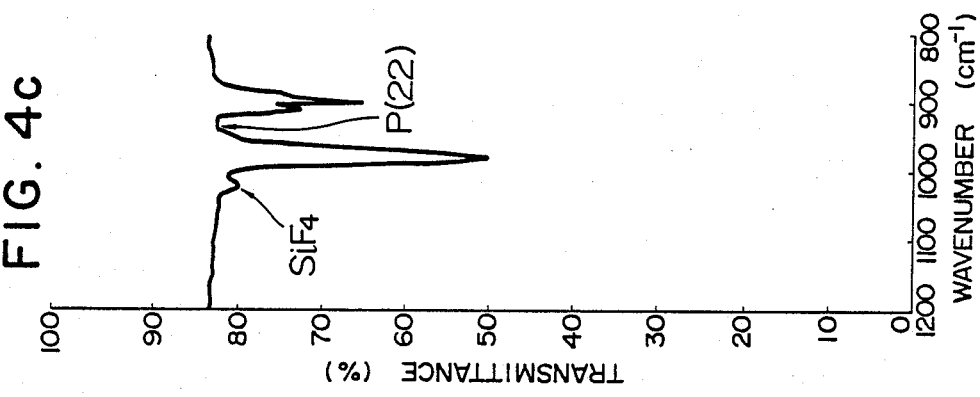
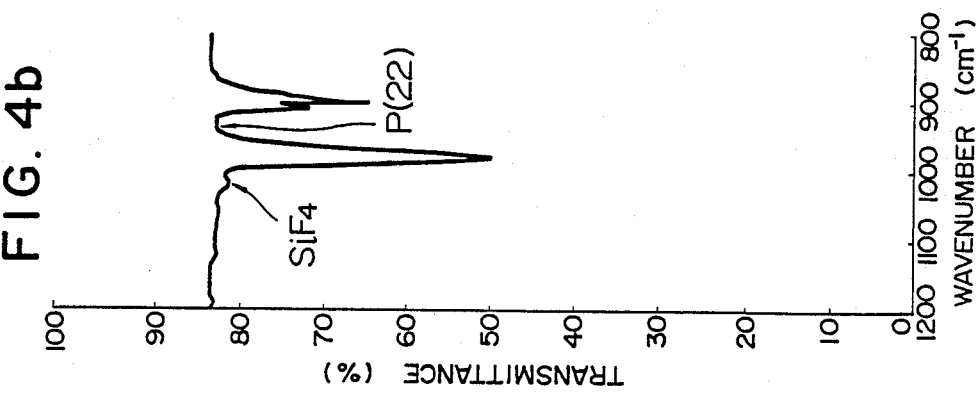
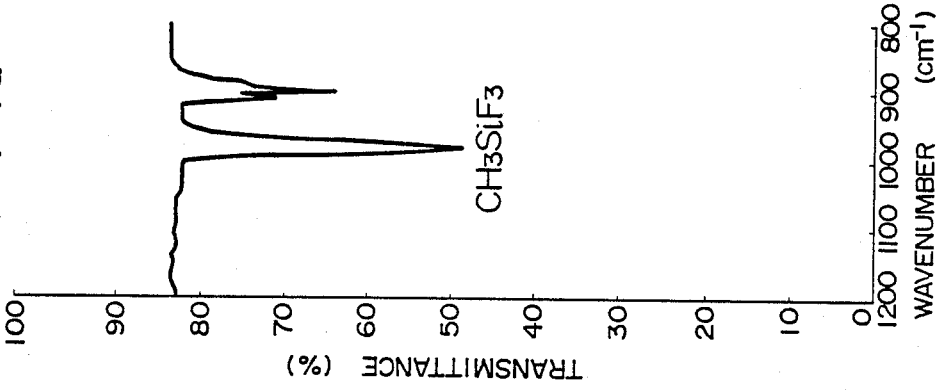

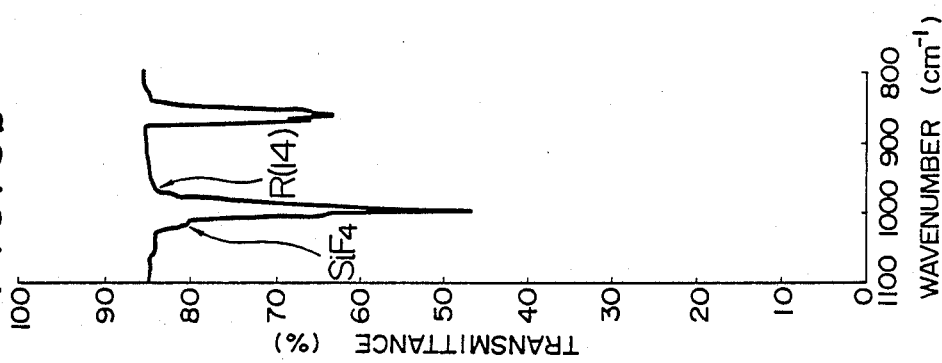
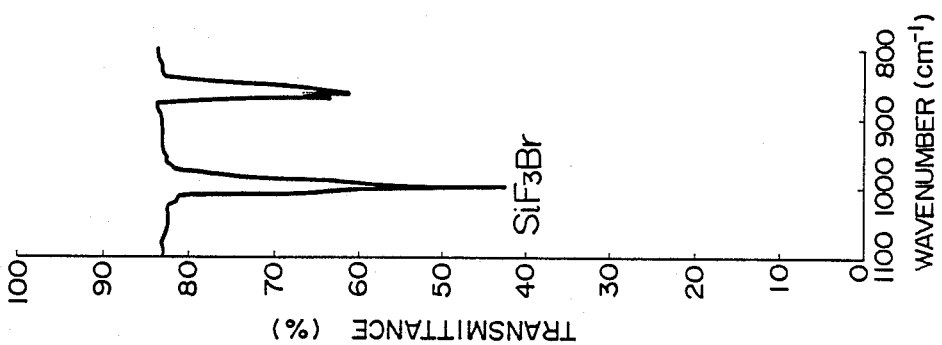

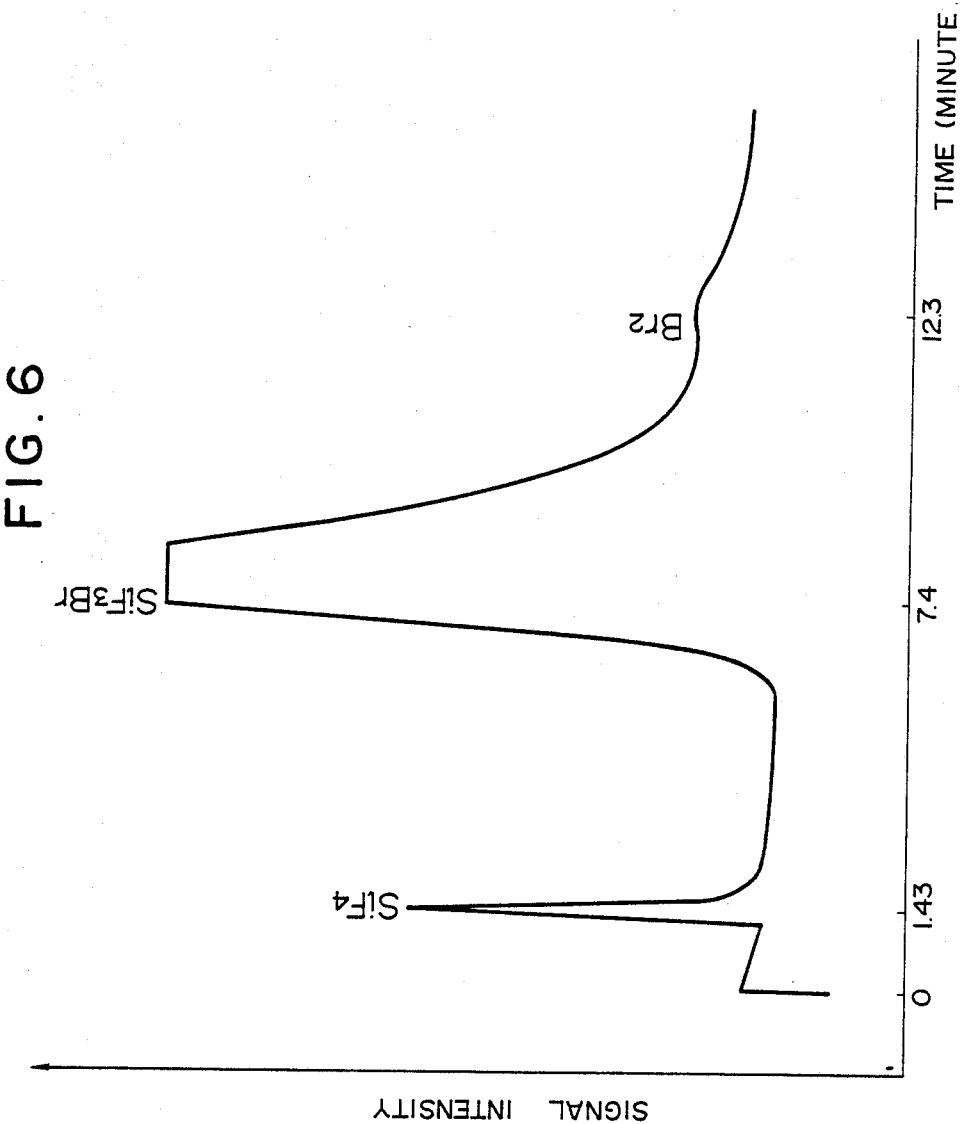

WORKING SUBSTANCES USED IN LASER ISOTOPE SEPARATION AND METHOD OF LASER ISOTOPE SEPARATION

BACKGROUND OF THE INVENTION

This invention relates to working substances used in laser isotope separation of silicon and methods of laser isotope separation of silicon utilizing the same working substances.

Optical absorption in the infrared region from $10^2$ to $10^3$ cm$^{-1}$ is due to change in molecule vibration energy. In the absorption, isotope effects are sometimes remarkably large. When molecules including a particular isotope are irradiated with light having a wavenumber near that of a large absorption band of the molecule, the molecules are selectivly excited. As a result, it becomes possible to induce a chemical reaction on the molecules and the particular isotopes are separated from other isotopes. However, normal molecules do not cause the chemical reaction by absorbing a single photon having a wavenumber within the above wavenumber region because energy of only the single photon is not enough to cause the chemical reaction. On the other hand, when the molecules are irradiated with strong infrared laser rays the molecules absorb up to dozens of photons and cause decomposition. This decomposition is called as infrared multiple-photon decomposition.

Natural silicon consists of isotopes of mass numbers 28, 29 and 30 in the abundance ratio of [$^{28}$Si]: [$^{29}$Si]:[$^{30}$Si]=92.23:4.67:3.10. The isotope separation of silicon by means of infrared multiple-photon decomposition has been scarecely investigated. Only experiment concerning enrichment of $^{29}$SiF$_4$ and $^{30}$SiF$_4$ in which SiF$_4$ was used as the working substance along with a carbon dioxide laser has been reported (J. L. Lyman and S. D. Rockwood; J. Appl. Phys., Vol. 47, No. 2, P. 595–601, (1976)).

However, the selectivity obtained by this experiment was very low. That is, concentrations of $^{29}$Si and $^{30}$Si were increased by only about 5%. Accordingly it is difficult to consider that the experiment can be applied to practical use. Demand for the silicon isotopes is increasing in the fields of medicine and agricultural chemicals and development of materials for electronic devices, so a method for high yield isotope separation of silicon is desired.

It is therefore an object of the present invention to provide working substances for use in the laser isotope separation of silicon and a method of laser isotope separation of silicon utilizing the same working substances which separates silicon isotopes in high yield.

SUMMARY OF THE INVENTION

This object is essentially attained by using a polysilane compound as the working substance for the laser isotope separation. The polysilane compound is defined by the formula $$Si_aX_bH_c$$

Where $2 \leq a \leq 3$, $0 \leq b \leq 2a+2$, $2a+2=b+c$ and X represents a kind or kinds of halogen.

The isotopes of silicon are separated by irradiating the above defined polysilane compound with the infrared laser rays. Si$_2$F$_6$, Si$_3$F$_8$, Si$_2$F$_5$Cl, Si$_2$F$_5$Br, Si$_2$F$_5$H or Si$_2$FH$_5$ may be given as an example of the above Si$_a$X$_b$H$_c$ polysilane. As the infrared laser, a carbon dioxide laser, a HF laser or a laser converting a wavelength into the infrared region (e.g. a hydrogen Raman Laser) can be used. Among the above mentioned lasers, the carbon dioxide laser is the most preferable laser because its wavelength nicely matches the frequency of the molecule vibration of the above defined polysilane compound and the intensity of the laser rays are strong.

In the normal molecules, the infrared multiple-photon decomposition occurs at a portion of high energy density near a focus obtained by focusing the laser rays, so that it is very difficult to obtain a desired silicon isotope in high yield. However, the above defined Si$_a$X$_b$H$_c$ polysilane compound is effectively decomposed even if laser pulses of very low energy density are used. This phenomenon is attributed to the very weak Si—Si bond.

The compounds derived from the above Si$_a$X$_b$H$_c$ polysilane compound's formula have an absorption band due to the molecule vibration from 930 to 1060 cm$^{-1}$ within the oscillation region of the infrared laser. When the above polysilane compounds are irradiated with pulsed infrared laser rays near the absorption band, they very efficiently cause the infrared multiple-photon decomposition and decompose into low order silanes.

The natural silicon compounds contain silicon isotopes $^{29}$Si and $^{30}$Si as well as $^{28}$Si in the above abundance ratio. It is known that the wavenumber of an infrared absorption peak of a compound including $^{29}$Si is smaller than that of the compound including $^{28}$Si, and that of the compound including $^{30}$Si is smaller than in the case of $^{29}$Si. Therefore, if the above defined Si$_a$X$_b$H$_c$ polysilane natural compound is irradiated with pulsed laser rays having a wavenumber adequate for the polysilane compound, the molecules containing a paticular isotope are selectively excited and cause the decomposition reaction reflecting the frequency difference between the absorption spectra. Accordingly the low order silane product of the unreacted compound is enriched with the silicon isotope $^{28}$Si, $^{29}$Si or $^{30}$Si.

The object of the invention is also attained by using a fluoromonosilane compound as the working substance. The fluoromonosilane compound is defined by the formula $$SiFX_1X_2X_3$$

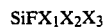

Where $X_1$ and $X_2$ are selected from the group consisting of H, Cl, Br, I, F, an alkyl radical and a halogen derivative of the alkyl radical, and $X_3$ is selected from the group consisting of H, Cl, Br, I, an alkyl radical and a halogen derivative of the alkyl radical.

The silicon isotopes are separated by irradiating the above defined fluoromonosilane compound with the infrared laser rays. SiF$_3$H, SiF$_3$Cl, SiF$_3$Br, SiF$_2$H$_2$, SiFCl$_3$, SiF$_3$CH$_3$, SiF$_3$CF$_3$ or SiF$_2$(CH$_3$)$_2$ may be given as an example of the above fluoromonosilane compound. As the infrared laser, a carbon dioxide laser, a HF laser or a laser converting a wavelength into infrared region (e.g. a hydrogen Raman laser) can be used as in the case of the polysilane compound. Within the above given lasers, the carbon dioxide laser is also the most preferable laser because its wavelength nicely matches the frequency of the molecule vibration of the above defined fluromonosilane compound and the intensity of the laser rays are strong.

All of the compounds derived from the above fluoromonosilane compound's formula have a strong absorption band due to Si—F bond vibration within the oscillation region of the infrared laser. When the fluoromonosilane compounds are irradiated with originally collimated or mildly focused infrared laser rays having a wavenumber near that of the absorption band for each of the compounds, they are easily decomposed and a reaction product is obtained. If the product is separated from the unreacted parent compound by means of low temperature distillation or gas chromatography and the abundance ratio of the silicon isotopes in the product is determined by mass spectrography, it is found from the determined abundance ratio that the product or the unreacted parent compound is enriched with $^{28}Si$, $^{29}Si$ or $^{30}Si$ by the irradiation of the laser rays at a wavenumber and a fluence adequate for the working substance. The adequate wavenumber of the laser rays is smaller than that of an infrared absorption peak by 20 to 50 $cm^{-1}$. But if laser rays having a much smaller wavenumber are used, yield of the product decreases greatly. It is recognized that the lower the temperature of the working substances gas is, the higher the selectivity is, and the pressure of the working substances gas is preferably about 1 Torr. If the pressure is too much higher the selectivity decreases.

It should be noted, in both cases, that $H_2$, $F_2$ or other impurity gas may be mixed with the working substance according to this invention.

As described above, by means of the infrared laser irradiation of the above defined polysilane or fluoromonosilane compound used as the working substance, $^{28}Si$, $^{29}Si$ and $^{30}Si$ are efficiently separated. Therefore, this invention is effective for the production of the silicon isotopes, demand for which is increasing in the fields of medicine and agricultural chemicals and the development of materials for electronic devices. In addition, the methods according to this invention extremely reduce the cost of production compared with the mass spectrometric method which is used for the silicon isotope separation, and can provide a large amount of silicon isotopes at a low price.

The specific nature of the invention, as well as other objects, uses and advantages thereof, will be clear from the description and the accompanying drawings.

BRIEF DESCRIPTION OF THE DRAWINGS

FIGS. 4a to 4c are infrared absorption spectra before and after the laser irradiation using $SiF_3CH_3$ as the working substance.

FIGS. 5a and 5b are infrared spectra before and after the laser irradiation using $SiF_3Br$ as the working substance, and FIG. 6 is an gas chromatogram after the laser irradiation using $SiF_3Br$ as the working substance.

EXAMPLES

Figure 1:
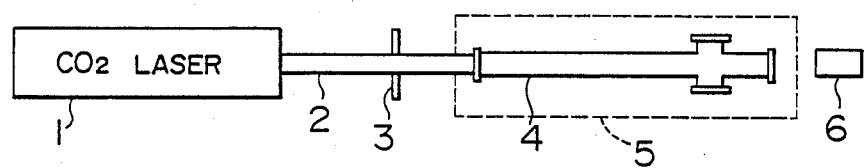
FIG. 1 illustrates an experimental apparatus used for carrying out this invention.

FIG. 1 illustrates an experimental apparatus used for carrying out this invention. A carbon dioxide TEA laser 1 uses a mixture of helium and carbon dioxide gases.

Pulsed laser rays 2 generated by this carbon dioxide TEA laser 1 are guided into a reaction cell 4 after passing through an iris 3. A working substance charged in the reaction cell 4 is irradiated with the laser rays 2. The reaction cell 4 is a 1-meter long cylindrical cell which is disposed in a constant temperature bath 5 and maintained at a predetermined temperature. The energy density, i.e. fluence of the laser rays is measured by a power meter 6 disposed in front of the reaction cell 4. Yield of the decomposition reaction product, i.e. the low order silane and enrichment factors of silicon isotopes, varies complicatedly with the wavenumber of the laser rays, the energy density thereof, sample temperature and sample pressure. However, the selectivity of the isotope separation generally increases in inverse proportion to the energy density, the sample temperature and the sample pressure. In many cases, dependance of the selectivity upon the wavenumber of the laser rays reflects the fact that molecules with different isotopes absorb laser rays of different wavenumber.

EXAMPLE 1

The apparatus illustrated in FIG. 1 was used for carrying out this example. $Si_2F_6$ at 2 Torr and room temperature was used as the working substance. Pulsed laser rays at 952.88 $cm^{-1}$ and 0.32J $cm^{-2}$ were used. The working substances were irradiated with the laser rays under an originally collimated condition, and the number of the radiated pulses was 500. After irradiation with the pulsed laser, the sample was condensed in a trap cooled to liquid nitrogen temperature, the condensed sample was collected and the $SiF_4$ product was separated by low temperature distillation.

Figure 2:
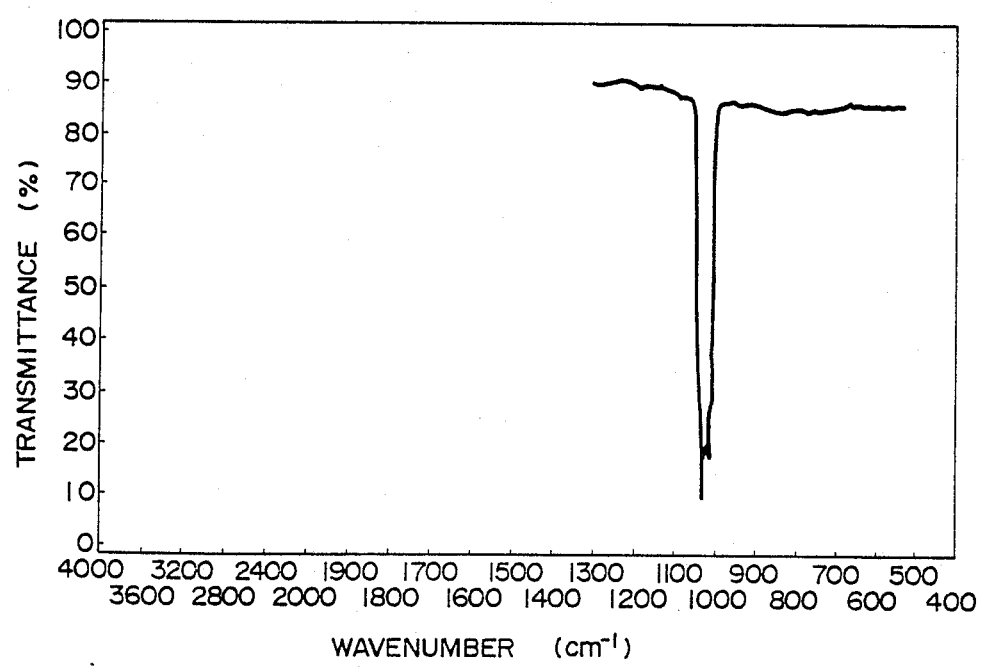
FIG. 2 is an infrared absorption spectrum of the $SiF_4$ product obtained by using $Si_2F_6$ as the working substance.

FIG. 2 shows the infrared absorption spectrum of $SiF_4$ obtained as described above. An absorption peak of $^{28}SiF_4$ at 1013.8 $cm^{-1}$ and another absorption peak shifted by 18 $cm^{-1}$ toward a smaller wavenumber than that of the peak are recognized. The latter absorption peak is derived from $^{30}SiF_4$. As a result, from the infrared spectrum it was found that the product was highly enriched with $^{30}Si$.

Results obtained by mass spectrometric analysis of the product $SiF_4$ are tabulated in the following Table 1. More specifically, ion signal intensities of $^{28}SiF_3^+$, $^{29}SiF_3^+$ and $^+SiF_3^+$, and $^{28}SiF_4^+$, $^{29}SiF_4^+$ and $^{30}SiF_4^+$ generated from $SiF_4$ and the abundance ratios of $^{28}Si$, $^{29}Si$ and $^{30}Si$ obtained from the ion signal intensities are shown in Table 1 where the ion signal intensities of $^{28}SiF_3^+$ and $^{28}SiF_4^+$ are assumed as 100.

TABLE 1

| Fragment ion of $SiF_4$ | Ion signal intensity | Abundance ratio (%) |
|---|---|---|
| $^{28}SiF_3^+$ | 100 | 50.9 |
| $^{29}SiF_3^+$ | 22.8 | 11.6 |
| $^{30}SiF_3^+$ | 73.7 | 37.5 |
| $^{28}SiF_4^+$ | 100 | 50.2 |
| $^{29}SiF_4^+$ | 26.1 | 13.1 |
| $^{30}SiF_4^+$ | 73.1 | 36.7 |

Table 1 shows that the abundance ratio of the $SiF_4$ product is $[^{28}Si]:[^{29}Si]:[Si] = 50.2:13.1:36.7$. From these results, it is found that the product was enriched with $^{29}Si$ and $^{30}Si$, 2.8 and 11.8 times compared with the natural aundance ratio, respectively.

In addition, the product $SiF_4$ was also obtained by means of the same operation as in the above except that $Si_3F_8$ was used as the working substance. The abundance ratio of this product was determined as $[^{28}Si]:[^{29}Si]:[^{30}Si] = 75.3:6.6:18.1$ from the result of the mass spectrometric analysis. Therefore, it was clearly found that the abundance ratio factors of $^{29}$Si and $^{30}$Si in the product increased compared with the natural abundance ratio.

Figure 3:
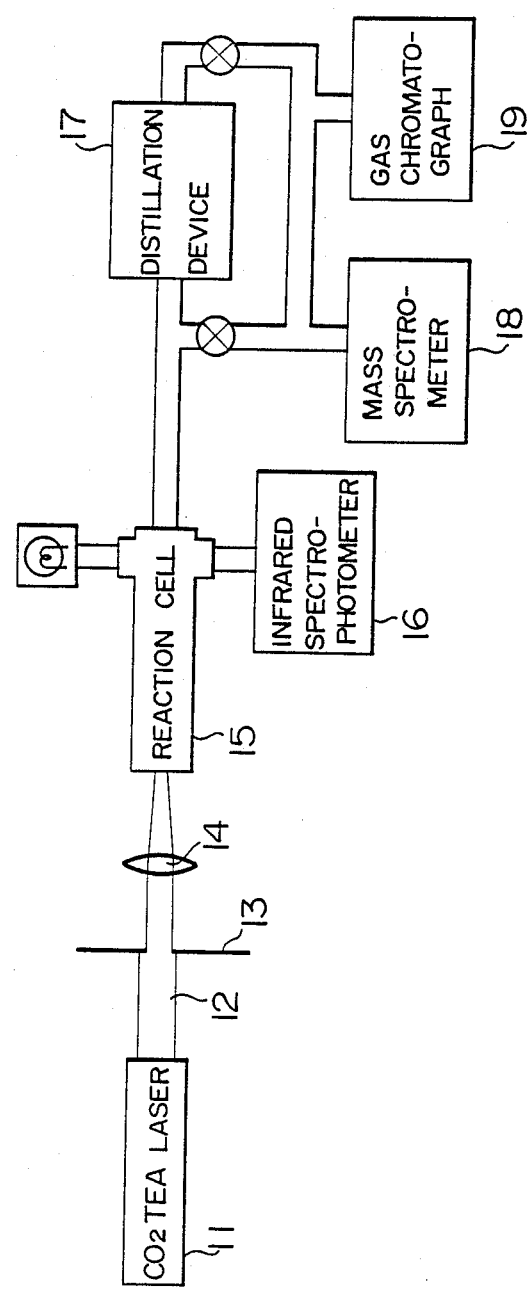
FIG. 3 illustrates another experimental apparatus used for carrying out this invention.

FIG. 3 illustrates another experimental apparatus used for carrying out this invention. A CO$_2$ TEA laser 11 (Lumnics 103-2) is used together with mixture of He and CO$_2$ or He, CO$_2$ and N$_2$. The former mixture generates laser pulses having shorter time duration and less energy, and the latter mixture generates laser pulses of longer time duration and a few times higher energy than the case of the former mixture. Pulsed laser rays 12 emitted from the CO$_2$ TEA laser 11 pass through an iris 13 with an aperture of a diameter of 1.0 or 1.6 cm, and the laser rays in an originally collimated geometry or after condensed by a BaF$_2$ lens 14 are guided into a reaction cell 15 filled with sample, i.e. the working substance. Infrared absorption spectrum of the sample before and after the laser irradiation are measured by an infrared spectrophotometer 16. The sample itself after the irradiation or only the SiF$_4$ product which is separated from the sample by a low temperature distillation device 17 is introduced into a mass spectrometer 18 and a gas chromatograph 19.

EXAMPLE II

In this example, SiF$_3$CH$_3$ was used as the working substance. FIG. 4a shows the infrared absorption spectrum of this working substance before laser irradiation. The pressure of the sample, i.e. the working substance gas, was 1 Torr. A strong absorption band is recognized near 980 cm$^{-1}$. This absorption band is attributable to a stretching vibration of Si—F bond. Nextly, pulsed laser rays of P(22) line (942.38 cm$^{-1}$) within the 10.6 $\mu$m band were generated by using the mixture of He, CO$_2$ and N$_2$ and the working substance was irradiated with the collimated laser rays. The fluence of the laser rays was 0.62J cm$^{-2}$. The infrared absorption spectrum measured after the irradiation with 5000 laser pulses is shown in FIG. 4b. The newly appearing shoulder of the absorption 3 spectrum curve near 1020 cm$^{-1}$ is attributable to SiF$_4$. The sample after the laser irradiation was introduced into the mass spectrometer 18 and the gas chromatograph 19, and abundance ratio of the silicon isotopes $^{28}$Si, $^{29}$Si and $^{30}$Si in the product was determined based on an ion signal magnitude ratio of fragment ions $^{28}$SiF$_3^+$, $^{29}$SiF$_3^+$ and $^{30}$SiF$_3^+$. The abundance ratio factors obtained as above are shown in Table 2. From this table it was found that the abundance ratio factors of $^{29}$Si and $^{30}$Si increased to 12.42% and 9.94%, respectively.

TABLE 2

| Ion signal intensities and abundance ratio of SiF$_4$ fragment ions after the irradiation of CH$_3$SiF$_3$ with the P(22) line of the collimated laser rays. | | |
|---|---|---|
| Fragment ion | Ion signal intensity | Abundance ratio (%) |
| $^{28}$SiF$_3^+$ | 100 | 77.64 |
| $^{29}$SiF$_3^+$ | 16.0 | 12.42 |
| $^{30}$SiF$_3^+$ | 12.8 | 9.94 |

Furthermore, another experiment was also carried out using SiF$_3$CH$_3$ as the working substance and a different condition of the laser irradiation. Pulsed laser rays of P(22) line (942.38 cm$^{-1}$) within the 10.6 $\mu$m band were generated by using the mixture of He and CO$_2$. These laser rays were diminished by a polyethylene film, focused by the lens 14 of a focal length 40 cm, and introduced into the reaction cell 15 filled with SiF$_3$CH$_3$ at 1 Torr. The fluence of the laser rays at the focal point was 5.6J cm$^{-2}$. The infrared absorption spectrum after the irradiation with 2000 laser pulses is shown in FIG. 4C. The sample after the laser irradiation was introduced into the gas chromatograph 19 and the mass spectrometer 18. As a result, as shown at Table 3, it was found that the abundance ratio factors of $^{29}$Si and $^{30}$Si increased to 8.87% and 11.19%, respectively.

TABLE 3

| Ion signal intensities and abundance ratio SiF$_4$ fragment ions after the irradiation of CH$_3$SiF$_3$ with the P(22) line of the focused laser rays. | | |
|---|---|---|
| Fragment ion | Ion signal intensity | Abundance ratio (%) |
| $^{28}$SiF$_3^+$ | 100 | 79.94 |
| $^{29}$SiF$_3^+$ | 11.1 | 8.87 |
| $^{30}$SiF$_3^+$ | 14.0 | 11.19 |

EXAMPLE III

In this example, SiF$_3$Br was used as the working substance. Pulsed laser rays of R(14) line (971.93 cm$^{-1}$) within the 10.6 $\mu$m band were generated by using the mixture of He, CO$_2$ and N$_2$ and the collimated laser rays were introduced into the reaction cell 15 filled with SiF$_3$Br at 1 Torr. The number of the irradiated laser pulses was 500. FIGS. 5a and 5b show the infrared absorption spectra before and after the laser irradiation, respectively. From these Figures, it is obvious that SiF$_4$ was generated by the laser irradiation. Nextly, the sample after the irradiation in the reaction cell 15 was introduced into the gas chromatograph 19 and the mass spectrometer 18. The gas chromatogram obtained is shown in FIG. 6. Peaks relating to SiF$_4$ and SiF$_3$Br are indicated in FIG. 6. Results of mass spectroscopic analysis for the product SiF$_4$ obtained as above are tablated in Table 4. From Table 4 it was found that the abundance ratio factors of $^{29}$Si and $^{30}$Si increased to 6.35% and 7.81%, respectively.

TABLE 4

| Ion signal intensities and abundance ratio of SiF$_4$ fragment ions after the irradiation of SiF$_3$Br with the R(14) line of the collimated laser rays. | | |
|---|---|---|
| Fragment ion | Ion signal intensity | Abundance ratio (%) |
| $^{28}$SiF$_3^+$ | 100 | 85.84 |
| $^{29}$SiF$_3^+$ | 7.4 | 6.35 |
| $^{30}$SiF$_3^+$ | 9.1 | 7.81 |

EXAMPLE IV

Si$_2$F$_6$ at 1 Torr as a sample of the working substance was charged in the reaction cell. Pulsed laser rays at 956.19 cm$^{-1}$ was generated by the use of the mixture He, CO$_2$ and N$_2$. The sample in the reaction cell was irradiated with the laser rays in a collimated state after passing through the iris of the diameter of 1.5 cm. The energy density of the laser rays was 0.73 J/cm$^2$ and the number of the laser rays was 300. The sample after the irradiation was introduced into the low temperature distillation device where the reaction product was separated out. The abundance ratio of the remaining unreacted compound was determined by the mass spectrometer. The abundance ratio was $^{28}$Si:$^{29}$Si:$^{30}$Si=99.53:0.44:0.03. Therefore, it was found that the unreacted compound Si$_2$F$_6$ was enriched with $^{28}$Si to a considerable extent.

EXAMPLE V $Si_2F_6$ was also used as in the example IV. This working substance $Si_2F_6$ was firstly irradiated with 200 pulses of laser rays at 956.19 cm$^{-1}$ and 0.73 J/cm$^2$. After the laser irradiation, the product enriched with $^{30}Si$ was separated out from the sample in the same manner as the Example IV. The unreacted compound $Si_2F_6$ depleted of $^{30}Si$ was secondly irradiated with 100 pulses of laser rays at 951.19 cm$^{-1}$ and 0.98 J/cm$^2$. The product which was produced by this second laser irradiation was also separated out from the sample by means of the distillation. The abundance ratio of the still remaining unreacted compound was determined by the mass spectrometer. The abundance ratio was $^{28}Si:^{29}Si:^{30}Si = 99.57:0.41:0.02$.

As in this example, if the product enriched with $^{30}Si$ is generated by the first laser irradiation, and then the remaining unreacted compound is enriched with $^{28}Si$ by the second laser irradiation, $^{28}Si$ is very effectively separated from $^{30}Si$.

We claim:

1. A method for separating silicon isotopes, which comprises a step of irradiating $Si_2F_6$ with infrared laser rays.

2. A method according to claim 1, wherein said infrared laser rays are laser rays emitted from a carbon dioxide laser.

* * * * *

UNITED STATES PATENT AND TRADEMARK OFFICE
CERTIFICATE OF CORRECTION

PATENT NO. : 4,824,537

DATED : April 25, 1989

INVENTOR(S) : Shigeyoshi ARAI, et al

It is certified that error appears in the above-identified patent and that said Letters Patent is hereby corrected as shown below:

On the title page, item [75],
Inventor "Kyoko SUGITA and Tatsuhiko HONGUU" should be omitted from the title page.

Signed and Sealed this

Twenty-sixth Day of December, 1989

Attest:

JEFFREY M. SAMUELS

Attesting Officer     Acting Commissioner of Patents and Trademarks

UNITED STATES PATENT AND TRADEMARK OFFICE
CERTIFICATE OF CORRECTION

PATENT NO. : 4,824,537

DATED : April 25, 1989

INVENTOR(S) : SHIGEYOSHI ARAI, ET AL.

It is certified that error appears in the above-identified patent and that said Letters Patent is hereby corrected as shown below:

Column 1, line 17 change "selectivly" to --selectively--.

Column 1, line 30 change "$[^{29}Si]:[^{3-0}Si]=$" to --$[^{29}Si]:[^{30}Si]=$--.

Column 1, line 33 change "scarecely" to --scarcely--.

Column 2, line 39 change "low order silane product of the unreacted" to --low order silane product or the unreacted--.

Column 2, line 60 change "Raman laser)" to --Raman Laser)--.

Column 3, line 47 change "out this invention," to --out this invention.--.

Column 3, line 59 change "FIG. 6 is an gas" to --FIG. 6 is a gas--.

Column 4, line 43 change "and $+SiF_3+$, and" to --and $^{30}SiF_3+$, and--.

UNITED STATES PATENT AND TRADEMARK OFFICE
CERTIFICATE OF CORRECTION

PATENT NO. : 4,824,537

DATED : April 25, 1989

INVENTOR(S) : SHIGEYOSHI ARAI, ET AL.

It is certified that error appears in the above-identified patent and that said Letters Patent is hereby corrected as shown below:

Column 4, line 59 change "$[^{28}Si]:[^{29}Si]:[Si]=$" to --$[^{28}Si]:[^{29}Si]:[^{30}Si]=$--.

Column 4, line 62 change "aundance" to --abundance--.

Column 4, line 67 change "$[^{28}Si]:[^{2-9}Si]:[^{30}Si]=$" --$[^{28}Si]:[^{29}Si]:[^{30}Si]=$--.

Column 5, line 40 change "shoulder of the absorption 3 spectrum curve" to --shoulder of the absorption spectrum curve--.

Column 5, line 32 change "Nextly," to --Next,--.

Column 6, line 31 change "Nextly," to --Next,--.

Column 6, line 37 change "tablated" to --tabulated--.

Signed and Sealed this

Fifth Day of January, 1993

Attest:

DOUGLAS B. COMER

*Attesting Officer*    Acting Commissioner of Patents and Trademarks